United States Patent [19]

Ogishi et al.

[11] 4,449,078
[45] May 15, 1984

[54] APPARATUS FOR PROVIDING AN OPTIMAL OPENING AND CLOSING OF A DOOR

[75] Inventors: Masaaki Ogishi; Isao Hagiwara; Yukio Yoshida; Kenzo Oono, all of Toyama, Japan

[73] Assignee: Yoshida Kogyo K. K., Tokyo, Japan

[21] Appl. No.: 415,707

[22] Filed: Sep. 7, 1982

[30] Foreign Application Priority Data

Sep. 28, 1981 [JP] Japan .............................. 56-151966

[51] Int. Cl.³ ............................................. H02P 1/58
[52] U.S. Cl. .................................... 318/102; 318/328; 318/463; 318/603
[58] Field of Search ............... 318/102, 257, 328, 463, 318/592, 594, 603, 607, 618, 625

[56] References Cited

U.S. PATENT DOCUMENTS

| | | | |
|---|---|---|---|
| 3,343,053 | 12/1963 | Toscano et al. | 318/603 |
| 3,416,054 | 12/1968 | Galles | 318/102 |
| 3,443,666 | 5/1969 | Abe et al. | 318/603 |
| 3,953,776 | 12/1974 | Wolf | 318/328 |
| 4,312,033 | 7/1979 | Sweeney et al. | 318/594 |
| 4,353,019 | 7/1980 | Sweeney, Jr. | 318/594 |

FOREIGN PATENT DOCUMENTS 428358 5/1975 U.S.S.R. .............................. 318/592

Primary Examiner—G. Z. Rubinson
Assistant Examiner—Bentsu Ro
Attorney, Agent, or Firm—Hill, Van Santen, Steadman & Simpson

[57] ABSTRACT

An apparatus for use in an automatic door system. Means are provided which compares the current position of the running door with a deceleration point to generate a low speed command upon their coincidence. A speed control responds to decelerate the door to a selected low speed. A measuring device measures a variable run-length of the door which is subject to variations in the mechanical condition of the door. In one embodiment, the device measures a low speed run-length over which the door has moved at a low speed. A comparator compares the measured low speed run-length with a preselected optimal low speed run-length to obtain error or departure from the optimal value. A correction logic produces an updated deceleration point by removing the error from the former deceleration point.

10 Claims, 5 Drawing Figures

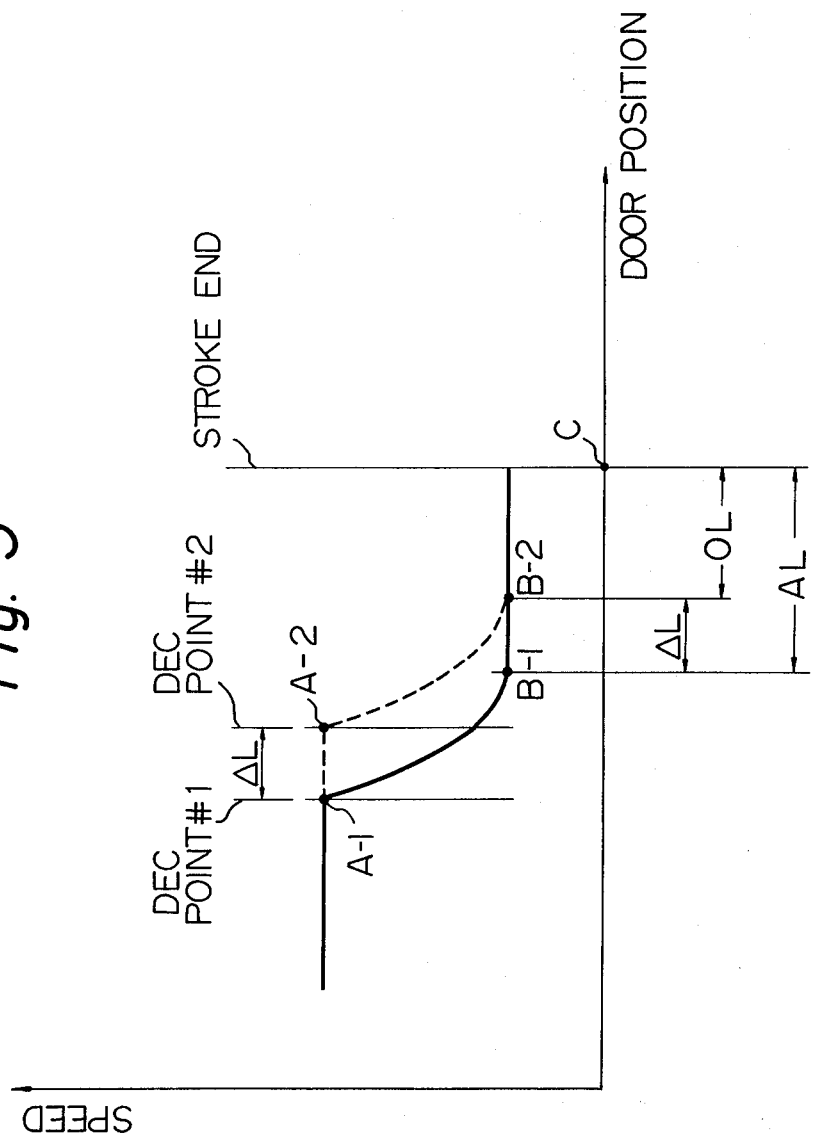

APPARATUS FOR PROVIDING AN OPTIMAL OPENING AND CLOSING OF A DOOR

BACKGROUND OF THE INVENTION

1. Field of the Invention

The present invention relates to an automatic door system, and more particularly to an apparatus for controlling such a system.

2. Description of the Prior Art

A typical automatic door system has a door coupled with and driven by a belt extending from a drive pulley to its driven pulley. The drive pulley is driven by a reversible motor. Controlled rotation of the reversible motor provides automatic opening and closing of the door.

A prior art apparatus for controlling such a door system employs several switches mounted in the path of travel of the door at different position thereof. An activating member typically in the form of a dog is mounted on the door and successively turns the switches on or off when the door is advanced. One of the switches is adapted to indicate, when activated by the dog, to the system when to decelerate the motion of the door. Another one of the switches placed at the end of stroke of the door serves to stop the door. However, this arrangement requires accurate positioning of the switches as well as a laborious work of electrical connection thereto.

A door control system recently proposed by the Applicant (Japanese Patent Application No. 133383/81, filed Aug. 27, 1981) aims to eliminate such disadvantages and utilizes a tacho generator driven by the motor for driving the door. Pulses indicative of the speed of the motor and therefore the door are derived from the AC output waveform of the tacho generator. A counter counts up or down the pulses relative to a predetermined stroke of the door so as to produce the current position of the door. The control system provides a controlled deceleration and stop of the door in accordance with the detected current position of the door.

In general, an automatic door is decelerated to a low speed before it reaches either of its stroke ends so that the door will have a smoothed stop action at the stroke end to prevent hazard.

For this purpose, it has been practiced to determine an optimal bracking torque and an optimal deceleration point on the basis of the door weight and the mechanical sliding resistance of the door. The prior art control system employs a decelerating switch physically positioned at the determined deceleration point. The output signal of the switch is used to switch the system from a high speed mode of operation to a reduced speed mode.

In the system recently proposed by the Applicant, a deceleration point is internally set in an electrical component. When the current door position signal from the counter coincides with the set value of decelerated point, a reduced speed drive system is switched into operation.

However, the sliding resistance of a door not only depends on temperatures and wind pressure against the door but also varies with time due to such as deterioration of a guide rail for the door. This leads to variations in optimal braking torque and deceleration point. Therefore, in order to maintain an optimal performance of the door either of the above systems would require a troublesome manual adjustment either by changing the set value of the deceleration point by means of such as a variable electrical register or by repositioning the decelerating switch mounted in the path of door each time the sliding resistance of the door changes. In actuality, repetitive adjustments of deceleration point following the change of sliding resistance are too much trouble for an operator to do. Thus, an optimal performance of the door through an extended time of period cannot be obtained.

SUMMARY OF THE INVENTION

With the above in mind, an object of the present invention is therefore to provide an improved apparatus for controlling the opening and closing of a door which does not require any switches or dogs physically positioned relative to the door, and which can maintain an optimal performance of the door operation irrespective of variations in the weight and/or sliding resistance of the door.

Another object of the present invention is to provide an apparatus for controlling the opening and closing of a door in such a manner that the door operation cycle complete in a minimum time while providing a safety operation.

In accordance with the present invention, there is provided a control apparatus for use in an automatic door system employing a door, means for driving the door, speed control means for the door driving means which comprises means for sensing the current position of the door, means for providing a deceleration point associated with the door operation, means for comparing the current door position with the deceleration point to generate a low speed command upon the coincidence therebetween and pass it to the speed control means, means for measuring a variable run-length of the door subject to variations in the mechanical condition of the door, means for setting a predetermined optimal low speed run-length over which the door is to run at a low speed until it reaches the end of door stroke (full open or closed), and means for correcting the deceleration point by utilizing the measured variable run-length and the optimal low speed run-length.

The above run-length measuring means may comprise means for measuring a low speed run-length over which the door has actually moved at a low speed. Alternatively, it may comprise means for measuring a decelerating run-length over which the door is decelerated from a high speed to a low speed.

In the case wherein the low speed run-length measuring means are used, the deceleration point correcting means may comprise a comparator for comparing the measured low speed run-length with the predetermined optimal low speed run-length to obtain the departure of the former from the latter and an arithmetic unit for subtracting the value of departure from the deceleration point.

In the case wherein the decelerating run-length measuring means are used, the correcting means may comprise means for combining (adding) the measured decelerating run-length with the predetermined optimal low speed run-length to produce a corrected deceleration point.

BRIEF DESCRIPTION OF THE DRAWINGS

The above and other objects, features and advantages of the present invention will be apparent as the description proceeds in conjunction with the drawings in which:

FIG. 5 is a graphical representation of the door operation illustrating the concept of automatic correction of deceleration point in accordance with the present invention.

DETAILED DESCRIPTION OF THE PREFERRED EMBODIMENT

Figure 1:
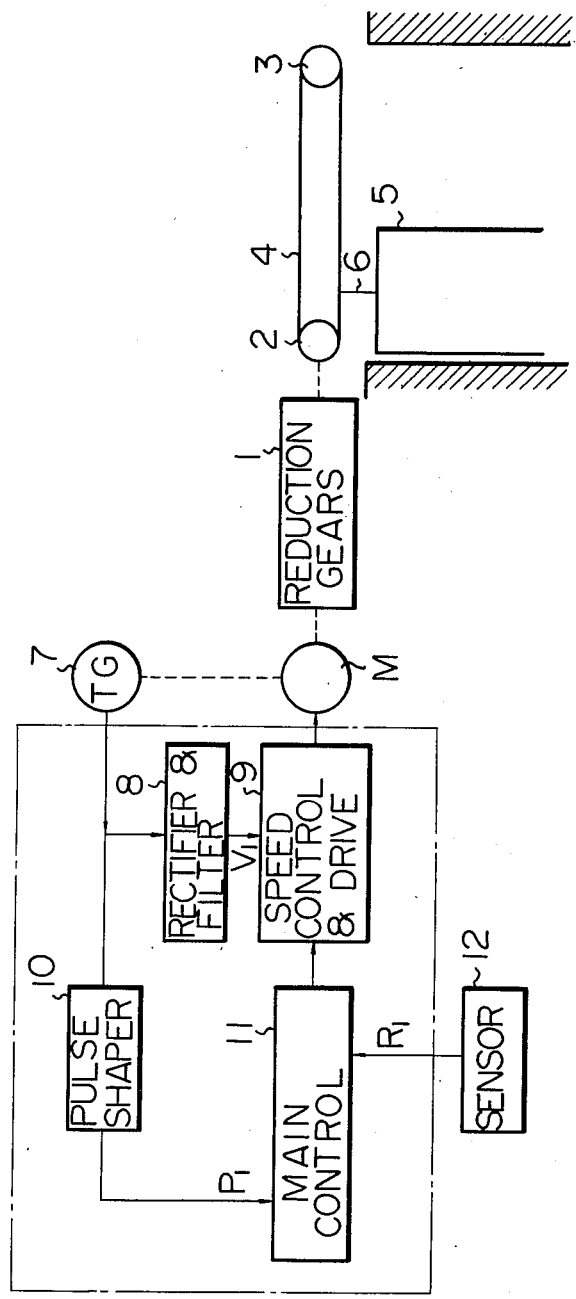
FIG. 1 is a diagrammatic view of the entire automatic door system incorporating the concept of the present invention.

FIG. 1 is a diagrammatic view of the entire door control system. A motor designated by M is coupled with a drive pulley 2 through a reduction gear 1. A belt 4 extends from the drive pulley 2 to a driven pulley 3 and is coupled to a door 5 by means of a coupling member 6. Therefore, a forward and reverse rotation of the motor M will provide an opening and closing of the door 5.

A tacho generator 7 in the form of an alternater is coupled with the motor M to produce an output signal which passes through a rectifier and ripple filter circuit 8 to a conventional speed control circuit 9 and also passes through a pulse shaper 10 to a main control circuit 11. A sensor 12 in the form of such as a mat switch, a photoelectric tube and so on is adapted to detect the approach of a person to the door 5 to produce and supply a signal $R_1$ to the main control 11 which in turn will generate control signals to control the speed control circuit 9 to drive the motor M.

Figure 2:
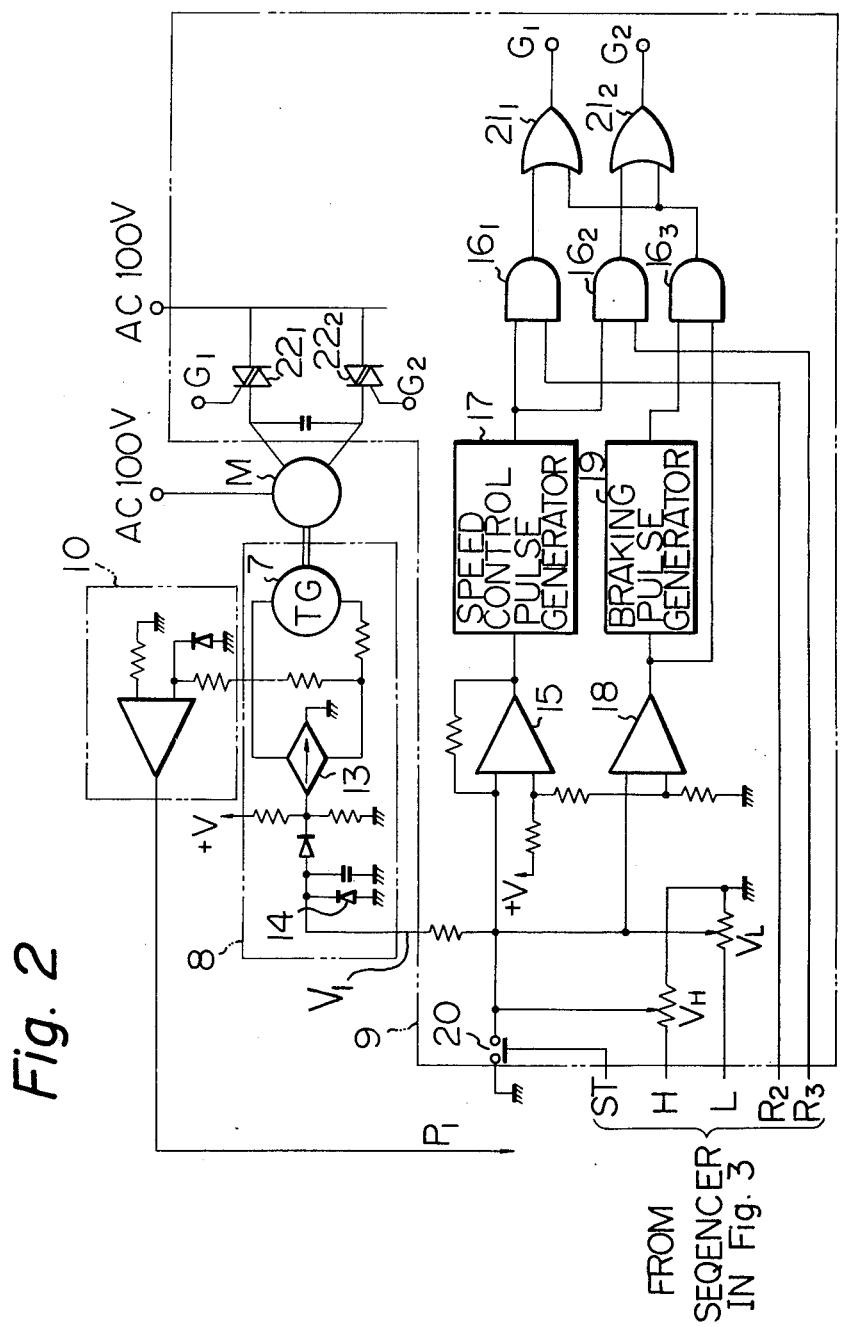
FIG. 2 shows part of the system in FIG. 1 illustrating a speed control, a tacho generator and associated circuit.

The details of each component will be described by reference to FIG. 2.

The tacho generator 7 is coupled to a rotation axis of the motor M and generates an AC voltage in responce to the rotation of the motor M. The generated voltage will increase and decrease in amplitude and frequency as the motor M runs at higher and lower speeds, respectively.

The rectifier and ripple filter circuit 8 comprises a diode bridge 13 adapted to provide a full-wave rectification of the output voltage from the tacho generator 7 and a ripple filter 14 adapted to obtain a smoothed DC voltage $V_1$. The output voltage $V_1$ is in proportion to the rotational speed of the motor M and is supplied to the speed control circuit 9.

The pulse shaper 10 includes half-wave rectifying means adapted to obtain positive half waves of the AC voltage from the tacho generator 7 and wave shaping means adapted to produce and supply rectangular pulses $P_1$ to the main control 11 to be counted therein. The number of the pulses $P_1$ indicates the length over which the door 5 has moved.

The speed control circuit 9 includes an operational amplifier 15 adapted to amplify the differential voltage between the output voltage $V_1$ from the rectifier and ripple filter circuit 8 and a set voltage of $V_H$ or $V_L$; $V_H$ indicates a predetermined high speed while $V_L$ indicates a predetermined low speed. The output of the operational amplifier 15 is connected to a speed control pulse generator 17 adapted to generate pulses in accordance with the amplitude of the signal from the operational amplifier 15 and supply them to first and second AND gates 16-1 and 16-2. An operational amplifier 18 compares the output voltage $V_1$ from the rectifier and ripple filter circuit 8 with the set voltage of $V_H$ or $H_L$ and generates a braking signal when the voltage $V_1$ becomes higher than the set voltage. The braking signal is applied to a third AND gate 16-3 and also to a braking pulse generator 19 which responsively produces braking pulses and applies them to the third gate 16-3. A stop signal ST is used to operate a stop switch 20 so that the output voltage $V_1$ is grounded. A signal $R_2$ indicates a forward rotation of the motor M and is supplied to the first AND gate 16-1. A signal $R_3$ commands a reverse rotation of the motor M and is supplied to the second AND gate 16-2. The output signals from the first and second AND gates 16-1 and 16-2 are connected to first and second OR gates 21-1 and 21-2, respectively. The output signal from the third AND gate is connected to both the first and second OR gates 21-1 and 21-2. Thus, when the forward signal $R_2$ is generated, speed control pulses from the pulse generator 17 passes through the enabled first AND gate 16-1 and the first OR gate 21-1 to a gate electrode $G_1$ of a first triac 22-1 for forward rotation of the motor M. On the other hand, when the reverse signal $R_3$ is generated, speed control pulses from the pulse generator 17 passes through the enabled second AND gate 16-2 and the second OR gate 21-2 to a gate electrode $G_2$ of a second triac 22-2 for reverse rotation of motor M. In this manner, the motor M is controlled to seclectively run at a high speed set by the voltage $V_H$ or a low speed set by the voltage $V_L$ and to be braked by the activation of the stop switch 20 in response to the stop signal ST so that the door 5 will correspondingly move at a high or low speed and will be stopped.

Before turning to the details of the main control 11, it may be convenient to describe the ways in which mechanical condition of the door (e.g. sliding resistance of door) will affect the door operation.

Figure 4:
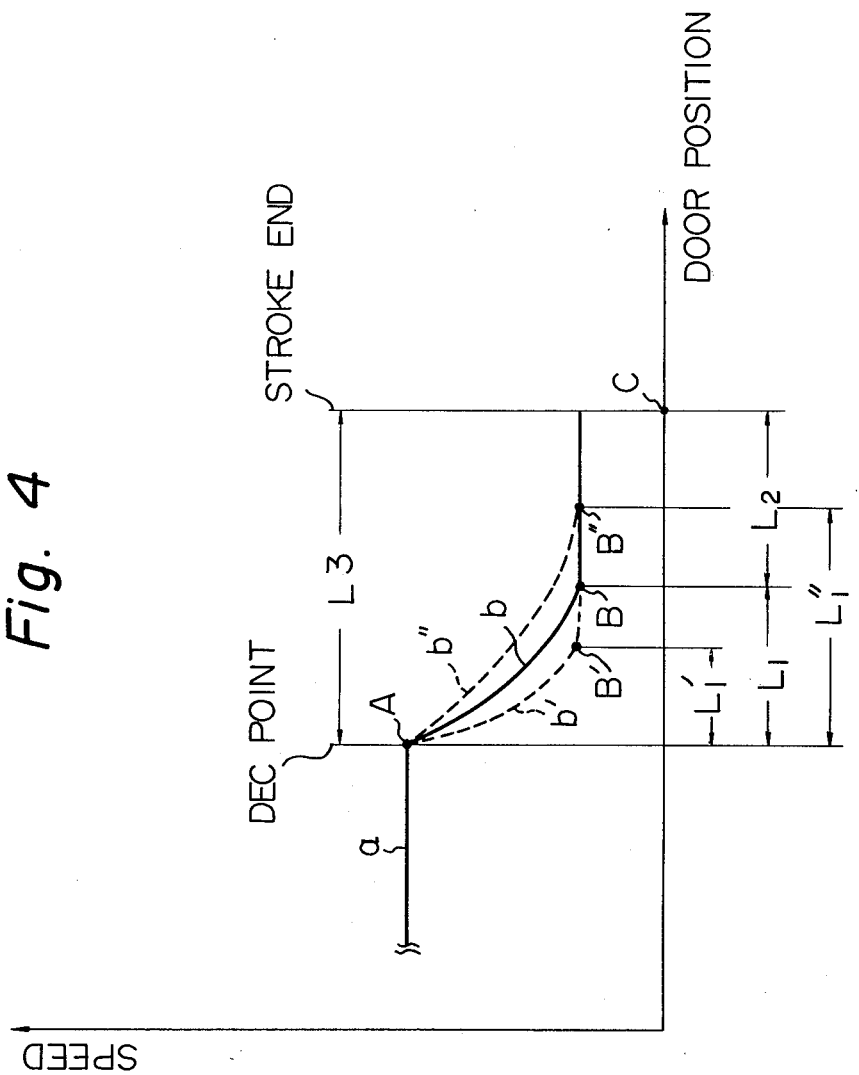
FIG. 4 is a graphical representation of the door operation illustrating door running characteristics for different mechanical conditions of the door.

FIG. 4 shows running characteristics of the door for different mechanical conditions. In a door opening (or closing) operation, the door starts at one end of its stroke (not shown in FIG. 4) and is accelerated to run at a high speed as indicated by a line a in FIG. 4. At a deceleration point as indicated by A, a low speed command is generated and fed to a door speed control as exemplified in FIG. 2, by which the door is decelerated toward a low speed indicated by the low speed command. At this point, it should be noted that the rate of decrease of the door speed depends on the existing mechanical condition (e.g. sliding resistance) of the door. For a middle sliding resistance, the door will slow down with a middle rate of decrease as indicated by curve b in FIG. 4, and the run-length during a decelerating period will be a medium one as indicated by a length $L_1$ in FIG. 4. When the door reaches point B, the door speed is reduced to a low speed, and thereafter the door continues running at that low speed until it is stopped at the stroke end of the door as indicated by a point C. However, for higher sliding resistance, the door will be decelerated more quickly. Thus the door will follow a curve b' having greater rate of decrease before it comes to run at a low speed at a point B'. Correspondingly, the run-length during a deceleration period will be shorter as indicated by a length $L_1'$. On the other hand, for lower sliding resistance, the door will be decelerated gradually to make curve b" having a lower rate of decrease of speed before it comes to run at a low speed at point B". Correspondingly, the deceleration run-length will be longer as indicated by a length $L_1''$.

It is understood that variation in sliding resistance leads to variations in run-length $L_1$ during a decelerating (transitory or settling time of) period during which the door is switched from a high speed to a stable low speed. If a deceleration point A is fixed relative to the end of stroke (i.e. distance $L_3$ as shown between the deceleration point A and stroke end C is constant), variations in decelerating run-length $L_1$ due to changes in mechanical door conditions lead to variations in low speed run-length $L_2$ over which the door will run at a low speed. This would often require an unnecessarily long time to complete a door opening and/or closing cycle and under some other circumstances, the door may collide with its counterpart or a wall which can be hazardous.

In accordance with the present invention, the deceleration point is automatically corrected each time that the door operation is performed. FIG. 5 is a graphical representation of the door operation illustrating the concept of automatic correction of deceleration point. During a first door opening (or closing) operation, the door is decelerated from a first deceleration point A-1. At a point B-1, the door is stabilized to run at a low speed. Means are provided which measure the actual length $A_L$ from the point B-1 to the stroke end C over which length the door has run at a low speed. Means are also provided which store a predetermined optimal low speed run-length $O_L$. Comparing means compares the actual low speed run-length with the optimal low speed run-length to obtain the difference $\Delta_L$ therebetween. Correction is made to the deceleration point so that a new deceleration point A-2 is shifted from the old A-1 by the departure $\Delta_L$ of the actual low speed run-length from the optimal.

In the next or second door opening (or closing) operation, the door will change its speed at the new corrrected deceleration point A-2. Since the mechanical condition of the door in the second door operation is generally similar to that in the first door operation as far as the second operation is done shortly after the first, the door will follow a similar decelerating curve. Thus, the decelerating motion of the door will complete at a point B-2 spaced from the point B-1 by a distance substantially equal to the departure $\Delta_L$. In other words, the point B-2 is located at a position space from the stroke end by a distance nearly equal to the optimal low speed run-length $O_L$. Therefore, the actual low speed run-length in the second door operation would correspond substantially to the selected optimal low speed run-length.

Figure 3:
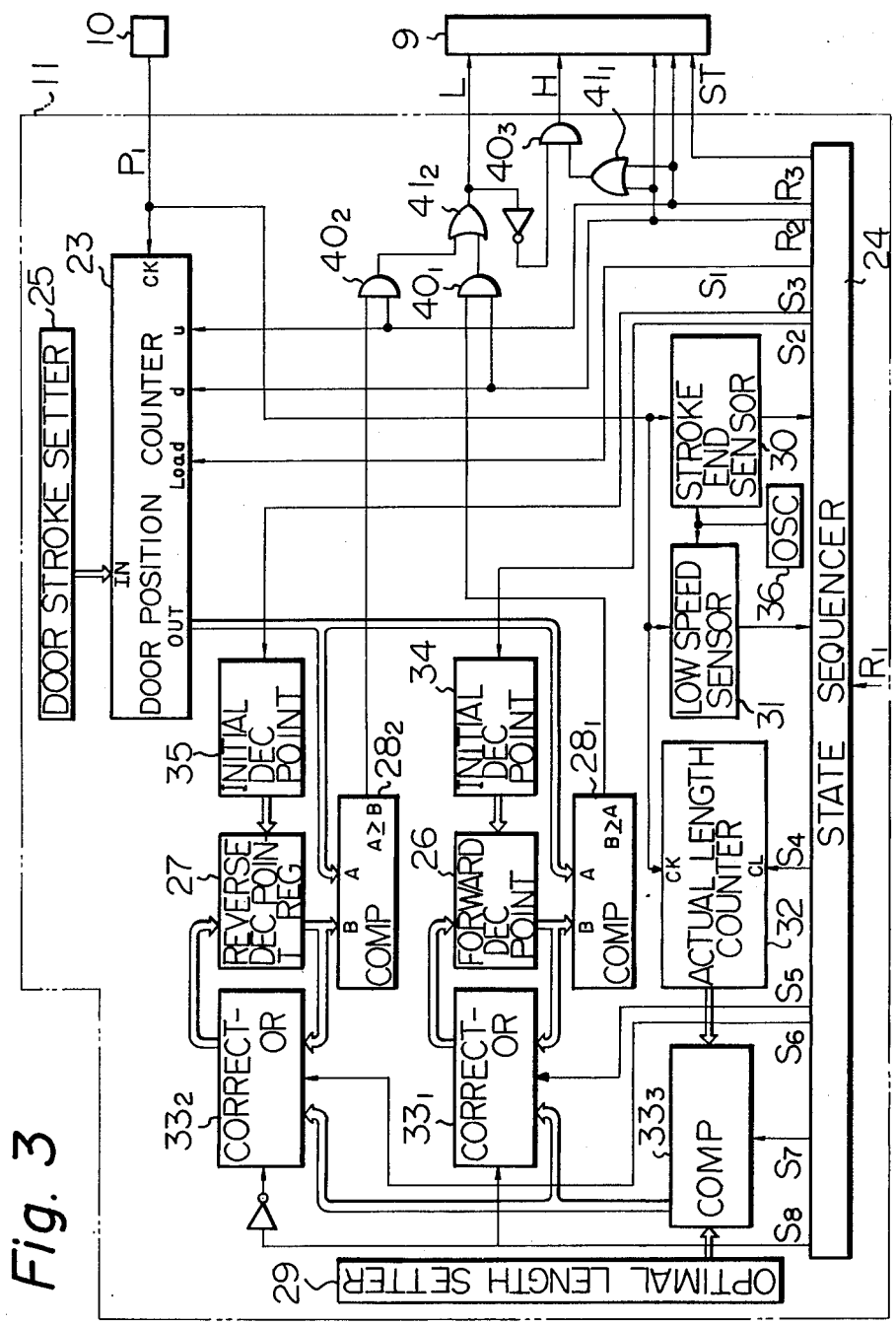
FIG. 3 shows a detailed block diagram of the main control embodying principles of the present invention.

Referring now to FIG. 3, there the main control 11 is illustrated in greater detail. The main control 11 includes a door position measuring means 23 in the form of counter adapted to count pulses $P_1$ having frequencies in proportion to the rotational speed of the motor for driving the door. The overall operation of the main control 11 is controlled by a state sequencer 24 provided therein which selectively generates a series of commands and state signals to various components in and out of the main control 11 in a predetermined sequence. The main control 11 includes a door stroke setter 25 for setting a predetermined value of the stroke of the door to be used. The door stroke setter 25 supplies the set value of stroke to the door position counter 23 when enabled by a signal $S_1$ from the state sequencer 24. Since a complete cycle of door operation comprises a door opening operation during which the door moves from one end of stroke (fully closed) to the other end of stroke (fully open) and a door closing operation during which the door moves reversely, the main control 11 includes two channels one for handling the opening mode of operation and the other for handling the closing mode of operation. Among the first channel associated with the door opening mode are a deceleration point settable means 26 in the form of storage or register for storing a deceleration point when the door moves forward to open, an initial deceleration point setter 34 for providing an initial deceleration point used in the system, a comparator 28-1 for comparing the current door position from the counter 23 with the deceleration point from the register 26, and a corrector 33-1 in the form of arithmetic unit for correcting the deceleration point from the register 26 according to the deviation of the actual low speed run-length of the door from a preselected optimal low speed run-length. Similarly, the second channel associated with the door closing mode of operation comprises deceleration point settable means 27 in the form of storage or register, an initial deceleration point setter 35, a second comparator 28-2 and a second corrector 33-2. Each of the initial deceleration points provided by initialisers 34 and 35 is preferably chosen in view of safety to be the most remote from the corresponding end of stroke than other possible deceleration points from the stroke end.

The main control 11 further includes low speed run-length measuring means including a low speed detector 31 and a stroke end detector 30. Each of the detectors may comprise a counter for counting pulses from an oscillator 36 adapted to generate pulses having a relatively high frequency. The counter counts pulses as received during one cycle of pulses $P_1$ having frequency in proportion to the speed of the door. When the count per cycle becomes greater than a selected value, the low speed detector 31 signals when the door has reached at a selected speed. Similarly the stroke end detector 30 signals when the door reaches the end of stroke. The actual low speed run-length measuring means further include a counter 32 adapted to count pulses $P_1$ as received during the period between the time of the low speed detector 31 and the time of the stroke end sensor 30 to obtain the actual low speed run-length.

The main control 11 further includes an optimal run-length setter 29 for providing a preselected optimal low speed run-length. Coupled with the optimal run-length setter 29 and the actual run-length counter 32 is third arithmetic means 33-3 preferably in the form of magnitude comparator for comparing the actual low speed run-length with the optimal low speed run-length to obtain the error or departure of the former from the latter. The value of departure is supplied to either of the correctors 33-1 and 33-2 which, in turn, corrects the deceleration point as mentioned.

Finally, a gate circuit is provided which selectively supplies high and low speed commands H and L to the speed control 9. The illustrated gate circuit includes a first AND gate 40-1 adapted to receive the output of the first comparator 28-1 and a forward rotation command $R_2$ from the sequencer 24 and a second AND gate 40-2 adapted to receive the output of the second comparator 28-2 and a reverse rotation command $R_3$ from the sequencer 24. The outputs of the AND gates 40-1 and 40-2 are connected to the OR gate 41-2 which selectively generates and passes a low speed command L to the speed control 9. The output of the OR gate 41-2 is also connected via an invertor to one input of a third AND gate 40-3. The other input of the third AND gate 40-3 is connected to an OR gate 41-1 adapted to receive the forward and reverse rotation and also command $R_2$ and $R_3$ from the sequencer 24. The third AND gate selectively generates and passes a high speed command H to the speed control 9.

The operation of the main control 11 will now be described.

When the circuitry is activated up, the state sequencer 24 generates signals $S_2$ and $S_3$ which are supplied respectively to the initial deceleration point setter 34 (for opening) and 35 (for closing). Thus, the contents thereof are set into the deceleration point (used in the opening mode of the door) register 26 and the deceleration point (used in the closing mode of the door) register 27.

Thereafter, when the sensor 12 detects the approach of a person to the door, it will generate a signal $R_1$. Responsively, the state sequencer 24 generates a signal $S_1$ and supplies it to the counter 23 which in turn receives a signal indicative of a predetermined stroke length of the door as set in the stroke setter 25.

At the same time, the state sequencer 24 generates a door opening signal $R_2$ (command of the forward rotation of the motor) and supplies it to the speed control 9 and also to the counter 23 so that the counter 23 will count down pulses $P_1$ from the pulse shaper 10. The signal $R_2$ is further supplied to the first OR gate 41-1. The third OR gate 40-3, generates a high speed command signal H and supplies it to the speed control 9 so that the motor will accelerate and run at a high speed indicated by the command signal H in a forward direction indicated by the forward command signal $R_2$. Thus, the door 5 will move at a corresponding high speed toward its open position.

As the motor rotates, pulses $P_1$ are supplied to the counter 23 which counts the pulses down from the value of stroke set in the door stroke setter 25 to obtain the current position of the door. The results of the respective down counting operations by the counter 23 are successively supplied to the first comparator 28-1 which compares the successive position data each indicating the current position of the door with a deceleration point in the opening mode, as stored in the register 26. When the current position coincides with the stored deceleration point, the first comparator 28-1 generates a signal and supplies it through the AND gate 40-1 enabled by the door opening signal $R_2$ to the second OR gate 41-2 to produce a low speed command signal L. Upon this signal, the motor M decelerates toward a selected low speed in a forward direction. The door 5 correspondingly is decelerated.

Pulses $P_1$ derived from the tacho generator 7 are also fed to the low speed detector 31, the stroke end detector 30 and the low speed run-length counter 32. The low speed detector 31 counts reference pulses from the oscillator 36, which are received during one cycle of the pulses $P_1$. When the count per cycle becomes greater than a selected value, the low speed detector 31 generates a signal indicating when the door 5 has a selected low speed.

Accordingly, as the door 5 is decelerated in response to the generation of the low speed command L and comes to move at a relatively stabilized low speed, the low speed detector 31 signals it to the status sequencer 24. Responsively, the sequencer 24 generates a signal $S_4$ to enable the low speed run-length measuring counter 32 to count pulses $P_1$.

When the door reaches a stroke end (full open), the stroke end detector 30 senses it in a similar manner as the low speed detector 31 and signals to the sequencer 24. Responsively, the state sequencer 24 generates a stop command ST and supplies it to the speed control 9 by which the motor is stopped. Then, the sequencer 24 generates a signal $S_7$ to the third arithmetic means 33-3 to enable it to perform the comparison between the actual low speed run-length count from the measuring counter 32 with a predetermined optimal low speed run-length from the optimal run-length setter 29. Then, the sequencer 24 generates a clear signal $S_4$ to clear the counter-type measuring counter 32.

The differential signal between the actual and optimal low speed run-length as resulted from the third arithmetic means 33-3 is applied to the first corrector 33-1 when a signal $S_8$ is received from the sequencer 24. Then, the first corrector 33-1 compares the differential signal indicating a value of deviation of the actual low speed run-length from the optimal low speed run-length with the deceleration point stored in the register 26 to subtract the latter from the former to provide a corrected deceleration point and transfer it back to the register 26 under the control of a signal $S_5$ from the sequencer 24.

Instead of subtracting all the deviation the optimal low speed run-length, correction can be made by multiplying the deviation value with a factor less than 1 to provide a reduced deviation and use it as a correction factor to a subtracted from the deceleratoin point. With this technique, corrections of the deceleration point are performed bit by bit, thus providing stabilization.

In the above, the measuring counter 32 measures the actual low speed run-length over which the door 5 has traveled at a low speed to the end of stroke. Alternatively, the counter 32 may measure the decelerating run-length over which the door 5 has moved from a high speed operation mode to a stable low speed operation mode. This can be achieved by starting the counting of pulses $P_1$ upon the generation of low speed command L as applied from the comparator 28-1 and by continuing counting until the low speed detector 31 senses when the door comes to move at a relatively stable low speed.

Along with such a decelerating run-length measuring means, a suitable modification will be made to the correction logic of deceleration point. The correction may be performed by an arithmetic unit for combining the measured decelerating run-length with the optimal low speed run-length by, for example, adding the former to the latter.

It will be understood that the main control 11 incorporating features of the present invention, calculates the deviation of the actual low speed run-length from the optimal low speed run-length for each cycle of door operatoin, and corrects the deceleration point on the basis of the calculated deviation so that the corrected deceleration point will match the current condition of the door weight and the sliding resistance of the door. The braking torque generated by the motor is assumed to be substantially constant.

When the door 5 is opened again upon the next approach of a person, the settable device has already stored an updated decelerating point which has been corrected so as to meet the door weight and the sliding resistance of the door, no manual adjustment of the decelerating point will be required. This arrangement assures that an optimal automatic door operation is performed.

When the signal indicative of the presence of a person by the door is absent, the state sequencer 24 generates a door closing command $R_3$ (reverse rotation of the motor) is applied to the second AND gate 40-2 and the speed control 9. Responsively, the speed control 9 causes the motor 5 to accelerate to a high speed in a reverse rotation. Further the command signal $R_3$ is supplied to the pulse counter 23 it is put the count up mode of operation.

Since the operation of the main control 11 to perform a door closing operation is generally similar to the above-described operation except that components (28-2, 33-2, 27, 35, etc) associated with the door closing operation are used, further description thereof will be omitted.

The present invention does not require any members such as switches and dogs physically placed relative to the door and always performs an optimal automatic door operation irrespective of variations of the door weight and the sliding resistance of the door without requiring any manual adjustment of the deceleration point.

It is to be understood that various changes and variations may be adopted in the apparatus of the present invention without departing from the spirit and scope thereof as defined by the appended claims.

What is claimed is:

1. In an apparatus for controlling the operation of an automatic door including means for providing a deceleration point associated with the door operation, means coupled with the door for driving the door, means for providing a speed control of said door driving means, and means for electrically obtaining the current position of the door, the improvement comprising:
   means for comparing said current position of the door with said deceleration point to generate a low speed command upon the coincidence of said current position with said deceleration point so that said speed control means will decelerate the door toward a low speed in response to the generation of said low speed command;
   means for measuring a variable run-length of the door which is subject to variations in the mechanical condition of the door;
   means for setting a predetermined low speed run-length of the door; and
   means for correcting said deceleration point by utilizing the measured run-length and the predetermined low speed run-length.

2. An apparatus as claimed in claim 1 wherein said run-length measuring means comprises means for measuring a low speed run-length over which the door has moved at a low speed.

3. An apparatus as claimed in claim 1 wherein said run-length measuring means comprises means for measuring a decelerating run-length over which the door is decelerated from a first speed to a second speed.

4. An apparatus as claimed in claim 2 wherein said correcting means comprises means for comparing the measured low speed run-length with said predetermined low speed run-length to obtain the difference therebetween and means for correcting said deceleration point in accordance with the value of said difference.

5. An apparatus as claimed in claim 3 wherein said correcting means comprises means for combining the measured decelerating run-length with said predetermined low speed run-length to produce a corrected deceleration point.

6. An apparatus as claimed in claim 2 wherein said low speed run-length measuring means comprises means for sensing when the door comes to run at a low speed, means for sensing when the door reaches the end of door stroke, and means for counting pulses as received during a period between the time of said low speed sensing means and the time of said stroke end sensing means, said pulses having frequency in proportion to the speed of door.

7. An apparatus as claimed in claim 3 wherein said decelerating run-length measuring means comprises means for sensing when the door comes to run at a low speed and means coupled with said low speed command generating means and said low speed sensing means for counting pulses, as received during a period between the time of said low speed command generating means and the time of said low speed sensing means.

8. An apparatus as claimed in claim 4 wherein said means for correcting said deceleration point in accordance with the value of said difference comprises means for multiplying said difference by a factor less than one to produce a reduced departure of said measured low speed run-length from said predetermined low speed run-length and means for subtracting said reduced departure from said deceleration point to produce an updated deceleration point.

9. A control apparatus for use in an automatic door system employing a door, means for driving said door, speed control means for said door driving means, said apparatus comprising:
   means for sensing the current position of said door;
   means for providing a deceleration point associated with the operation of said door;
   means for comparing said current position of said door with said deceleration point to generate a low speed command upon the coincidence of said current position with said deceleration point and supply it to said speed control means;
   means for measuring a variable run-length of said door subject to variations in the mechanical condition of said door,
   means for setting a predetermined optimal low speed run-length over which said door is to run at a low speed until it reaches the end of stroke; and
   means for correcting said deceleration point by utilizing the measured variable run-length and said optimal low speed run-length.

10. In a door controlling system including a door, means for driving said door to run between ends of its stroke, speed control means for controlling said driving means in such a manner that said door will be initially accelerated from one end of said stroke, then run at a high speed, then be decelerated, then run at a low speed, and finally stop at the other end of said stroke, thus completing one stroke operation of said door, the improvement comprising:
   means for tracking the motion of said door to obtain the current position thereof;
   means for providing a deceleration point associated with said one stroke operation of said door;
   means coupled with said speed control means for comparing said current position of said door with said deceleration point to generate a low speed command upon the coincidence of said current position with said deceleration point so that said speed control means will decelerate said door toward said low speed in response to the generation of said low speed command;

means for measuring the actual low speed run-length over which said door has moved at said low speed;

means for setting a predetermined low speed run-length;

means for comparing said actual low speed run-length with said predetermined low speed run-length to obtain the difference therebetween; and means for correcting said deceleration point in accordance with the value of said difference.

* * * * *